Jan. 15, 1929.  S. BOLOZKY  1,699,275
SANITARY MILK BOTTLE CAP
Filed July 27, 1927
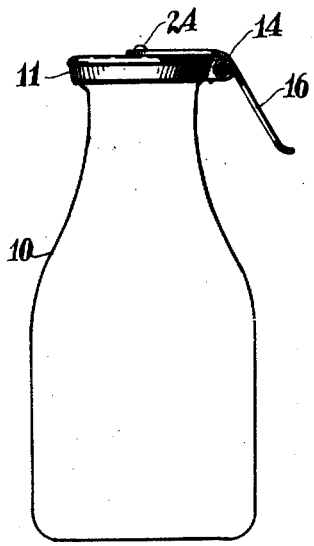
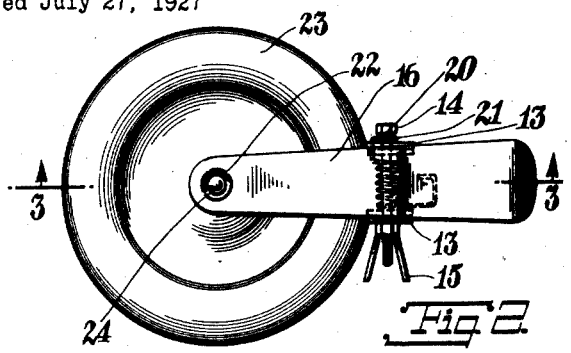
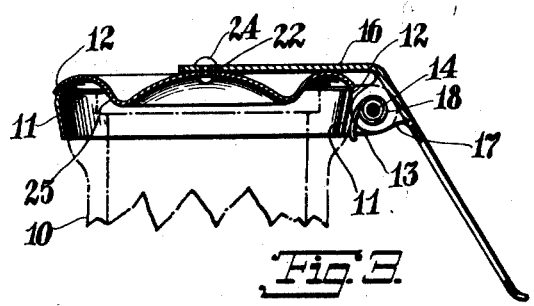
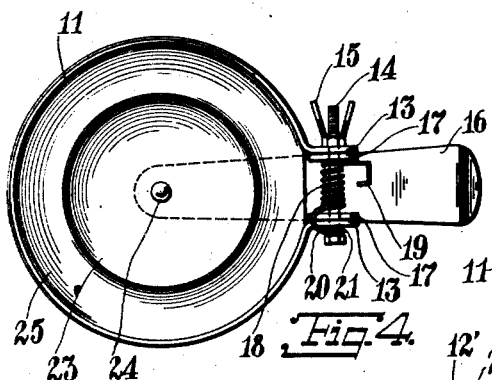
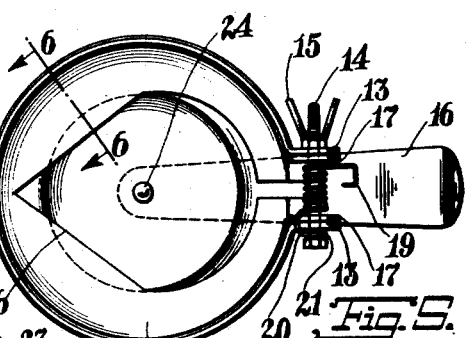
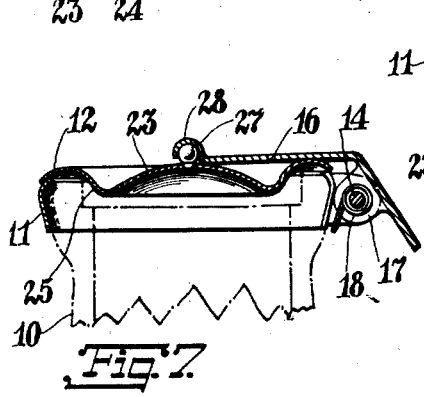
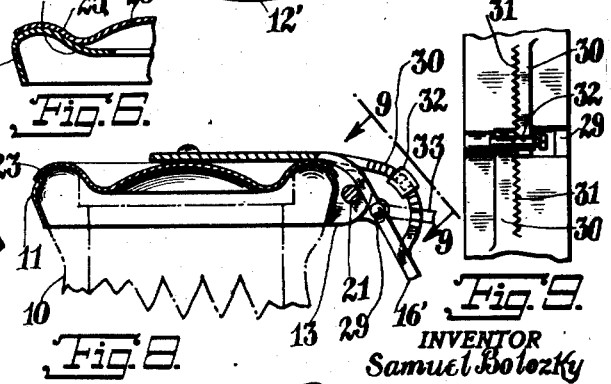
INVENTOR
Samuel Bolozky
BY
ATTORNEY Patented Jan. 15, 1929.

1,699,275

UNITED STATES PATENT OFFICE.

SAMUEL BOLOZKY, OF WEST NEW YORK, NEW JERSEY.

SANITARY MILK-BOTTLE CAP.

Application filed July 27, 1927. Serial No. 208,806.

This invention relates generally to capping devices, and has more particular reference to a novel milk bottle cap.

The invention has for an object the provision of a milk bottle cap of simple construction which is handy and efficient in action, and which can be manufactured and sold at a reasonable cost.

For further comprehension of the invention and of the objects and advantages thereof, reference will be had to the following description and accompanying drawing, and to the appended claims in which the various novel features of the invention are more particularly set forth.

Referring to the accompanying drawing forming a material part of this disclosure:

Fig. 1 is a front view of a milk bottle with the invention device applied thereto.

Fig. 2 is a plan view of the invention device.

Fig. 3 is a vertical sectional view taken on the line 3—3 of Fig. 2, a fragmentary portion of the milk bottle being shown in dot dash lines.

Fig. 4 is a bottom view of the invention device.

Fig. 5 is a view similar to Fig. 4, but disclosing a modification of the invention.

Fig. 6 is a fragmentary sectional view taken on the line 6—6 of Fig. 5.

Fig. 7 is a sectional view similar to Fig. 3 but disclosing another modification of the invention.

Fig. 8 is a side view of the invention device, as seen in Fig. 1 but disclosing another modification thereof.

Fig. 9 is a fragmentary view of a handle used in the invention device and seen as looking in the direction of arrows 9—9 of Fig. 8.

The reference numeral 10 indicates generally a milk bottle of customary construction, and the top thereof is engaged by a flange structure consisting of slightly obliquely formed rim 11 with an integral top turned-in portion 12, and a pair of parallel ears 13. A bolt 14 engages through the ears 13, and is provided with a wing nut 15 to clamp the flange structure to the top of the milk bottle. A handle 16 is formed with a pair of parallel ears 17 engaged between the ears 13 and held against displacement by the bolt 14 which also engages through these ears. Co-axially on the bolt 14, and between the ears 17 is a spring 18 having one end 19 bearing against the handle 16, and the other end 20 bearing against the ear 13, thereafter engaged about the bolt 14 as at 21, and this spring acts to normally urge the end of the handle 16 which extends within the rim 11, towards the rim, and this end of the handle is formed with a depression 22. A cover 23 is attached at its center to the depression 22 by means of a rivet 24, and this cover is formed along its rim with a cam surface 25 adapted to automatically align the cover tight upon the turned-in portion 12, by virtue of the action of spring 18. Upon pressing the free end of handle 16 towards the bottle, the cover 23 is raised from the top of the bottle, and upon releasing the handle 16, spring 18 forces the handle to a position that the cover re-engages the top of the bottle.

Referring in particular to Figs. 5 and 6, the rim 11 is formed with an extended integral top turned-in portion 12' having a spout shaped opening 26, so that when the cover 23 is opened, the contents of the bottle may be readily poured in a stream.

The modification shown in Fig. 7 discloses a ball 27 secured to the center of the cover 23, and engaged by a ball socket 28 at the end of handle 16, to flexibly connect the handle and cover.

Figs. 8 and 9 disclose the handle 16' hinged as at 29, arcuate member 30 projecting from each side of the hinged parts of the handle, the center of curvature of these arcuate members coinciding with the hinge 29, and the adjacent faces of the arcuate members being provided with serrations 31, while clamping means 32 is adapted to clamp these arcuate members in adjusted relative positions, as for example to normally position the free end of handle 16' as indicated by the dot dash lines 33. The further the free end of handle 16' is normally from the side of the bottle, the longer is the possible motion thereof, and thus the cover 23 may be opened to adjusted degrees.

While I have illustrated and described the preferred form, construction, and arrangement of the several elements employed, it will be understood that the device is, nevertheless, susceptible of considerable modification therein, and I therefore reserve the privilege of resorting to all such changes as may be fairly embodied within the spirit and scope of the invention as claimed.

Having thus described my invention what

I claim as new, and desire to protect by Letters Patent of the United States is:

1. A milk bottle cap comprising a slightly obliquely formed rim, an integral turned-in top portion therefor, a pair of parallel ears projecting from the ends of the rim, a handle formed with a pair of parallel ears engaged between the said ears, a bolt engaged through the ears, a wing nut on the end of the bolt, a spring co-axially disposed on the bolt and between the ears, acting between the handle and a certain one of the ears, normally urging the handle in a certain direction, a cover coactable with turned-in top portion of the rim, and flexibly mounted on one end of the handle, and means for adjusting the possible motion of the handle.

2. A milk bottle cap comprising a slightly obliquely formed rim, an integral turned-in top portion therefor, a pair of parallel ears projecting from the ends of the rim, a handle formed with a pair of parallel ears engaged between the said ears, a bolt engaged through the ears, a wing nut on the end of the bolt, a spring co-axially disposed on the bolt and between the ears, acting between the handle and a certain one of the ears, normally urging the handle in a certain direction, a cover co-actable with turned-in top portion of the rim, and flexibly mounted on one end of the handle, the said handle being formed of two sections hinged together, an arcuate member projecting from each section, the center of curvature of these arcuate members coinciding with the hinge point, serrations formed on the adjacent faces of the arcuate members, and clamping means forcing said serrations into engagement with each other.

3. A milk bottle cap comprising a slightly obliquely formed rim, an integral turned-in top portion therefor, a pair of parallel ears projecting from the ends of the rim, a handle formed with a pair of parallel ears engaged between the said ears, a bolt engaged through the ears, a wing nut on the end of the bolt, a spring co-axially disposed on the bolt and between the ears, acting between the handle and a certain one of the ears, normally urging the handle in a certain direction, a cover co-actable with turned-in top portion of the rim, and flexibly mounted on one end of the handle, the said handle being formed of two sections hinged together, an arcuate member projecting from each section, serrations formed on the adjacent faces of the arcuate members, and clamping means forcing said serrations into engagement with each other.

In testimony whereof I have affixed my signature.

SAMUEL BOLOZKY.